US012755336B2

(12) United States Patent
Nishiguchi

(10) Patent No.: US 12,755,336 B2
(45) Date of Patent: Oct. 6, 2026

(54) IMAGE PROCESSING APPARATUS, IMAGE CAPTURING APPARATUS, IMAGE PROCESSING METHOD, AND STORAGE MEDIUM THAT RECORD FIRST AND SECOND SUBJECT INFORMATION IN ASSOCIATION WITH A COMPOSITE IMAGE

(71) Applicant: CANON KABUSHIKI KAISHA, Tokyo (JP)

(72) Inventor: Tatsuya Nishiguchi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 601 days.

(21) Appl. No.: 18/062,637

(22) Filed: Dec. 7, 2022

(65) Prior Publication Data

US 2023/0196508 A1 Jun. 22, 2023

(30) Foreign Application Priority Data

Dec. 20, 2021 (JP) ................................ 2021-206266

(51) Int. Cl.

*G06T 3/4038* (2024.01)
*G06F 16/16* (2019.01)
*G06T 5/50* (2006.01)

(52) U.S. Cl.

CPC ............ *G06T 3/4038* (2013.01); *G06F 16/16* (2019.01); *G06T 5/50* (2013.01); *G06T 2207/20224* (2013.01)

(58) Field of Classification Search

CPC . G06T 2207/20224; G06T 5/50; G06T 11/00; G06T 2210/22; G06V 10/774;

(Continued)

(56) References Cited

U.S. PATENT DOCUMENTS 10,073,910 B2 * 9/2018 Baek ......................... G06T 3/16
2011/0242130 A1 * 10/2011 Toba ....................... G06T 11/00 345/629

(Continued)

FOREIGN PATENT DOCUMENTS

JP 2011-211636 A 10/2011
JP 2015001609 A 1/2015

(Continued)

OTHER PUBLICATIONS

Office Action issued Sep. 12, 2025, in corresponding Japanese Patent Application No. 2021-206266, with English translation (10 pages).

*Primary Examiner* — Molly Wilburn
(74) *Attorney, Agent, or Firm* — Venable LLP

(57) ABSTRACT

An image processing apparatus including at least one processor and/or at least one circuit that function as an obtainment unit configured to obtain a first image, first subject information indicating a first subject detected from the first image, a second image, and second subject information indicating a second subject detected from the second image, a composition unit configured to generate a composite image by compositing the first image and the second image, and a recording unit configured to record the first subject information and the second subject information in association with the composite image. The first subject information and the second subject information cannot be detected from the composite image because the first subject and the second subject have been composited into the composite image in an area where they overlap with one other.

14 Claims, 9 Drawing Sheets

(58) Field of Classification Search
CPC ........ G06V 10/10; G06V 10/40; G06V 20/60; G06V 40/20; G06V 20/40; G06V 20/44
See application file for complete search history.

(56) References Cited

U.S. PATENT DOCUMENTS

| | | | | |
|---|---|---|---|---|
| 2014/0368695 | A1* | 12/2014 | Sako | H04N 9/7904 348/231.99 |
| 2018/0025498 | A1* | 1/2018 | Omari | G06V 20/13 348/144 |
| 2019/0124261 | A1* | 4/2019 | Toyoda | H04N 23/63 |

FOREIGN PATENT DOCUMENTS

| | | | |
|---|---|---|---|
| JP | 2015-099559 | A | 5/2015 |
| JP | 2019-009577 | A | 1/2019 |

* cited by examiner

FIG. 5A

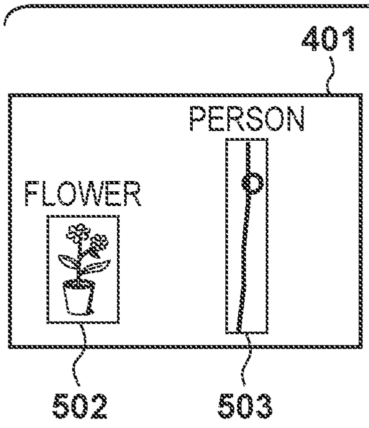

ANNOTATION INFORMATION

FILE NUMBER:1

SUBJECT 1
COORDINATES (x0,y0,w0,h0), OBJECT = FLOWER,
TYPE = COSMOS

SUBJECT 2
COORDINATES (x1,y1,w1,h1), OBJECT = PERSON,
GENDER = MALE, AGE = 30S,
NAME, HEAD POSITION, EYE POSITION...

FIG. 5B

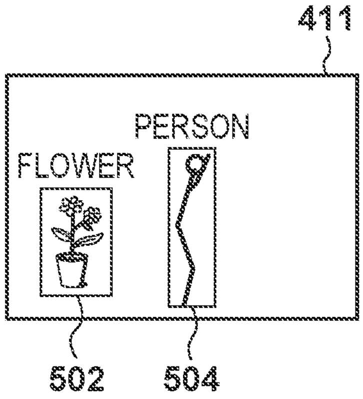

ANNOTATION INFORMATION

FILE NUMBER:11

SUBJECT 1
COORDINATES (x0,y0,w0,h0), OBJECT = FLOWER,
TYPE = COSMOS

SUBJECT 2
COORDINATES (x11,y11,w11,h11), OBJECT = PERSON,
GENDER = MALE, AGE = 30S,
NAME, HEAD POSITION, EYE POSITION ...

FIG. 5C

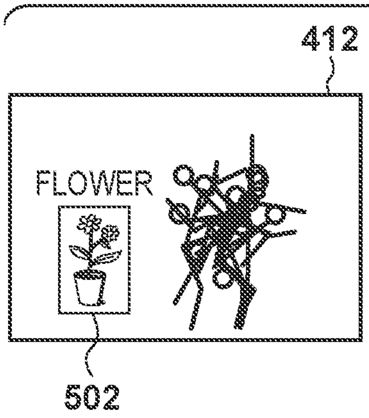

ANNOTATION INFORMATION

FILE NUMBER:12

SUBJECT 1
COORDINATES (x0,y0,w0,h0), OBJECT = FLOWER,
TYPE = COSMOS

FIG. 6A

| MAIN ANNOTATION INFORMATION |
| --- |
| FILE NUMBER:12<br>SUBJECT 1<br>COORDINATES (x0,y0,w0,h0), OBJECT = FLOWER, TYPE = COSMOS |

FIG. 6B

| SUB-ANNOTATION INFORMATION |
| --- |
| MATERIAL IMAGE 1<br>FILE NUMBER:1<br>SUBJECT 1<br>COORDINATES (x0,y0,w0,h0), OBJECT = FLOWER, TYPE = COSMOS<br>SUBJECT 2<br>COORDINATES (x1,y1,w1,h1), OBJECT = PERSON, GENDER = MALE, AGE = 30S, NAME, HEAD POSITION, EYE POSITION ... |
| MATERIAL IMAGE 2<br>FILE NUMBER:2<br>SUBJECT 1<br>COORDINATES (x0,y0,w0,h0), OBJECT = FLOWER, TYPE = COSMOS<br>SUBJECT 2<br>COORDINATES (x2,y2,w2,h2), OBJECT = PERSON, GENDER = MALE, AGE = 30S, NAME, HEAD POSITION, EYE POSITION ... |
| : |
| MATERIAL IMAGE 11<br>FILE NUMBER:11<br>SUBJECT 1<br>COORDINATES (x0,y0,w0,h0), OBJECT = FLOWER, TYPE = COSMOS<br>SUBJECT 2<br>COORDINATES (x11,y11,w11,h11), OBJECT = PERSON, GENDER = MALE, AGE = 30S, NAME, HEAD POSITION, EYE POSITION ... |

FIG. 7A

SUB-ANNOTATION INFORMATION

SUBJECT 1
- COORDINATES (x0,y0,w0,h0), OBJECT = FLOWER, TYPE = COSMOS
  - MATERIAL FILE:1,2,3,4,5,6,7,8,9,10,11

SUBJECT 2
- OBJECT = PERSON, GENDER = MALE, AGE = 30S, NAME
- COORDINATES (x1,y1,w1,h1), HEAD POSITION, EYE POSITION ...
  - MATERIAL FILE:1
- COORDINATES (x2,y2,w2,h2), HEAD POSITION, EYE POSITION ...
  - MATERIAL FILE:2

:

- COORDINATES (x11,y11,w11,h11), HEAD POSITION, EYE POSITION...
  - MATERIAL FILE:11

FIG. 7B

SUB-ANNOTATION INFORMATION

SUBJECT 1
- COORDINATES (x0,y0,w0,h0), OBJECT = FLOWER, TYPE = COSMOS

SUBJECT 2
- OBJECT = PERSON, GENDER = MALE, AGE = 30S, NAME
- COORDINATES (x1,y1,w1,h1), HEAD POSITION, EYE POSITION...
- COORDINATES (x2,y2,w2,h2), HEAD POSITION, EYE POSITION

:

- COORDINATES (x10,y10,w10,h10), HEAD POSITION, EYE POSITION...
- COORDINATES (x11,y11,w11,h11), HEAD POSITION, EYE POSITION...

IMAGE PROCESSING APPARATUS, IMAGE CAPTURING APPARATUS, IMAGE PROCESSING METHOD, AND STORAGE MEDIUM THAT RECORD FIRST AND SECOND SUBJECT INFORMATION IN ASSOCIATION WITH A COMPOSITE IMAGE

BACKGROUND OF THE INVENTION

Cross Reference to Priority Application

This application claims the benefit of Japanese Patent Application No. 2021-206266, filed Dec. 20, 2021, which is hereby incorporated by reference herein in its entirety.

Field of the Invention

The present invention relates to an image processing apparatus, an image capturing apparatus, an image processing method, and a storage medium.

Description of the Related Art

In recent years, artificial intelligence (AI) techniques, such as deep learning, have been utilized in a variety of technical fields. For example, conventionally, digital still cameras, and the like, are known to have a function to detect a human face from a shot image. Also, Japanese Patent Laid-Open No. 2015-099559 discloses a technique to accurately detect and to recognize animals, such as dogs and cats, without limiting a detection target to humans.

Furthermore, there is a known technique whereby a composite image is generated by compositing a plurality of material images, such as multiple composition and trajectory composition. In connection to this technique, Japanese Patent Laid-Open No. 2019-009577 discloses that only shooting information of an image including a main subject (a material image) is added to a post-composition image and recorded.

Assume a case when subjects are detected, recognized, and so forth using, for example, AI techniques from a composite image that has been generated by compositing a plurality of material images (multiple composition, trajectory composition, or the like). There is a possibility that, in the composite image, subjects in respective material images overlap at the same position. This case has a problem in that it is difficult to correctly perform detection, recognition, and so forth, of all subjects included in the composite image. However, the techniques of Japanese Patent Laid-Open No. 2015-099559 and Japanese Patent Laid-Open No. 2019-009577 cannot address such a problem.

SUMMARY OF THE INVENTION

The present invention has been made in view of the aforementioned situation. The present invention provides a technique whereby, even in a case when a subject detected from a material image cannot be detected from a composite image generated from a plurality of material images, subject information indicating this subject can be obtained together with the composite image.

According to a first aspect the present invention provides an image processing apparatus comprising an obtainment unit configured to obtain a first image, first subject information indicating a first subject detected from the first image, a second image, and second subject information indicating a second subject detected from the second image, a composition unit configured to generate a composite image by compositing the first image and the second image, and a recording unit configured to record the first subject information and the second subject information in association with the composite image.

According to a second aspect, the present invention provides the image processing apparatus according to the first aspect further comprising, a detection unit configured to detect a third subject from the composite image, and a generation unit configured to generate third subject information indicating the third subject that has been detected from the composite image, wherein the recording unit records the third subject information in association with the composite image.

According to a third aspect, the present invention provides an image capturing apparatus comprising the image processing apparatus according to the first aspect, an image capturing unit configured to generate the first image and the second image, a detection unit configured to detect the first subject from the first image, and to detect the second subject from the second image; and a generation unit configured to generate the first subject information indicating the first subject that has been detected from the first image, and the second subject information indicating the second subject that has been detected from the second image, wherein the obtainment unit obtains the first image and the second image generated by the image capturing unit, as well as the first subject information and the second subject information generated by the generation unit.

According to a fourth aspect, the present invention provides an image capturing apparatus comprising the image processing apparatus according to the second aspect, and an image capturing unit configured to generate the first image and the second image, wherein the detection unit detects the first subject from the first image, and detects the second subject from the second image, the generation unit generates the first subject information indicating the first subject that has been detected from the first image, and the second subject information indicating the second subject that has been detected from the second image, and the obtainment unit obtains the first image and the second image generated by the image capturing unit, as well as the first subject information and the second subject information generated by the generation unit.

According to a fifth aspect, the present invention provides an image processing method executed by an image processing apparatus comprising obtaining a first image, first subject information indicating a first subject detected from the first image, a second image, and second subject information indicating a second subject detected from the second image, generating a composite image by compositing the first image and the second image, and recording the first subject information and the second subject information in association with the composite image.

According to a sixth aspect, the present invention provides a non-transitory computer-readable storage medium that stores a program for causing a computer to execute an image processing method comprising obtaining a first image, first subject information indicating a first subject detected from the first image, a second image, and second subject information indicating a second subject detected from the second image, generating a composite image by compositing the first image and the second image, and recording the first subject information and the second subject information in association with the composite image.

Further features of the present invention will become apparent from the following description of exemplary embodiments with reference to the attached drawings.

BRIEF DESCRIPTION OF THE DRAWINGS

FIGS. 5A and 5B are diagrams showing examples of annotation information including the inference result for a material image.

FIG. 5C is a diagram showing an example of annotation information including the inference result for a composite image.

FIG. 6A is a diagram showing an exemplary configuration of main annotation information.

FIG. 6B is a diagram showing an exemplary configuration of sub-annotation information.

FIGS. 7A and 7B are diagrams showing exemplary configurations of sub-annotation information.

DESCRIPTION OF THE EMBODIMENTS

Figure 1:
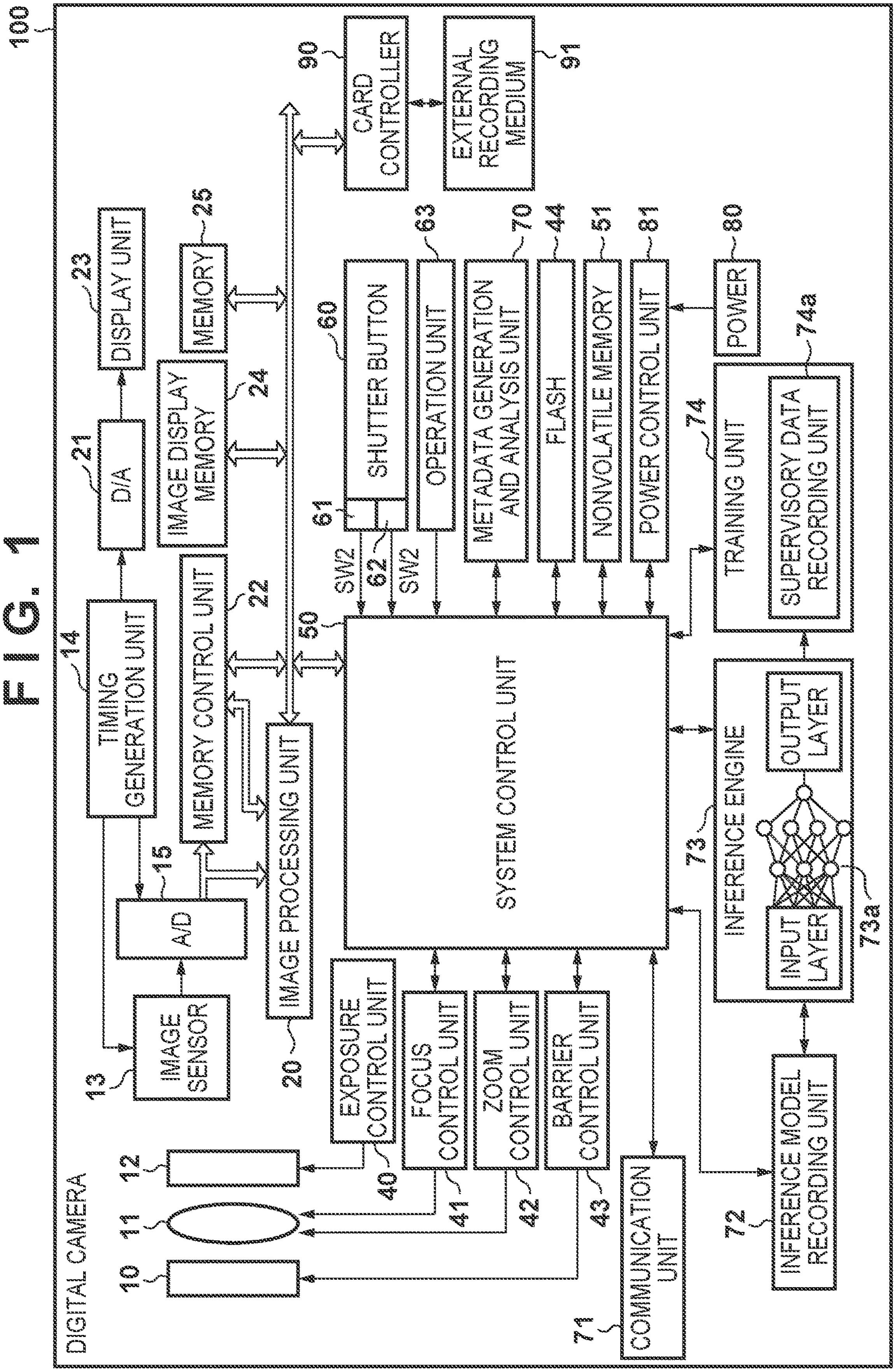
FIG. 1 is a block diagram showing an exemplary configuration of a digital camera 100.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and redundant description thereof is omitted.

Furthermore, the following description exemplarily presents a digital camera (an image capturing apparatus) as an image processing apparatus that performs subject classification with use of an inference model. However, in the following embodiments, the image processing apparatus is not limited to a digital camera. The image processing apparatus according to the following embodiments may be any apparatus as long as it is an apparatus that has digital camera functions to be described below, and may be, for example, a smartphone, a tablet PC, or the like.

First Embodiment

Configuration of Digital Camera 100

FIG. 1 is a block diagram showing an exemplary configuration of a digital camera 100. A barrier 10 is a protection member that covers an image capturing unit of the digital camera 100, including a photographing lens 11, thereby preventing the image capturing unit from being stained or damaged. The operations of the barrier 10 are controlled by a barrier control unit 43. The photographing lens 11 causes an optical image to be formed on an image capturing surface of an image sensor 13. A shutter 12 has a diaphragm function. The image sensor 13 is composed of, for example, a CCD or CMOS sensor, or the like, and converts the optical image that has been formed on the image capturing surface by the photographing lens 11 via the shutter 12 into electrical signals.

An A/D converter 15 converts analog image signals output from the image sensor 13 into digital image signals. The digital image signals converted by the A/D converter 15 are written to a memory 25 as so-called RAW image data pieces. In addition to this, development parameters corresponding to respective RAW image data pieces are generated based on information at the time of shooting, and written to the memory 25. Development parameters are composed of various types of parameters that are used in image processing for recording images using a JPEG method, or the like, such as an exposure setting, white balance, color space, and contrast.

A timing generation unit 14 is controlled by a memory control unit 22 and a system control unit 50, and supplies clock signals and control signals to the image sensor 13, the A/D converter 15, and a D/A converter 21.

An image processing unit 20 executes various types of image processing, such as predetermined pixel interpolation processing, color conversion processing, correction processing, resize processing, and image composition processing, with respect to data from the A/D converter 15 or data from the memory control unit 22. Also, the image processing unit 20 executes predetermined image processing and computation processing with use of image data obtained through image capture, and provides the obtained computation result to the system control unit 50. The system control unit 50 realizes AF (autofocus) processing, AE (automatic exposure) processing, and EF (preliminary flash emission) processing by controlling an exposure control unit 40 and a focus control unit 41 based on the provided computation result.

Furthermore, the image processing unit 20 executes predetermined computation processing with use of image data obtained through image capture, and also executes AWB (auto white balance) processing based on the obtained computation result. In addition, the image processing unit 20 reads in image data stored in the memory 25, and executes compression processing or decompression processing with use of such methods as a JPEG method, an MPEG-4 AVC method, an HEVC (High Efficiency Video Coding) method, and a lossless compression method for uncompressed RAW data. Then, the image processing unit 20 writes the image data for which processing has been completed to the memory 25.

Also, the image processing unit 20 executes predetermined computation processing with use of image data obtained through image capture, and executes editing processing with respect to various types of image data. For example, the image processing unit 20 can execute trimming processing in which the display range and size of an image is adjusted by causing unnecessary portions around image data not to be displayed, and resize processing in which the size is changed by enlarging or reducing image data, display elements of a screen, and the like. Furthermore, the image processing unit 20 can execute RAW development whereby image data is generated by applying image processing, such as color conversion, to data that has undergone compression processing or decompression processing with use of a lossless compression method for uncompressed RAW data, and converting the resultant data into a JPEG format. Moreover, the image processing unit 20 can execute moving image cutout processing in which a designated frame of a moving image format, such as MPEG-4, is cut out, converted into a JPEG format, and stored.

Also, the image processing unit 20 includes a composition processing circuit that composites a plurality of image data pieces. In the present embodiment, the image processing unit 20 can execute addition composition processing, weighted addition composition processing, lighten composition processing, and darken composition processing. The lighten composition processing is processing for generating one composite image from a plurality of material images by selecting the brightest pixel values of the plurality of material images as the pixel values of respective pixels of the composite image. The darken composition processing is processing for generating one composite image from a plurality of material images by selecting the darkest pixel values of the plurality of material images as the pixel values of respective pixels of the composite image.

Furthermore, the image processing unit 20 also executes, for example, processing for causing OSD (On-Screen Display), such as a menu to be displayed on a display unit 23 and no particular characters, to be superimposed on image data to be displayed.

In addition, the image processing unit 20 executes subject detection processing for detecting a subject that exists within image data and detecting a subject region thereof with use of, for example, input image data and information of a distance to the subject at the time of shooting, which is obtained from, for example, the image sensor 13. Examples of detectable information (subject detection information) include information of the position, size, inclination, and the like, of a subject region within an image, and information indicating certainty.

The memory control unit 22 controls the A/D converter 15, the timing generation unit 14, the image processing unit 20, an image display memory 24, the D/A converter 21, and the memory 25. RAW image data generated by the A/D converter 15 is written to the image display memory 24 or the memory 25 via the image processing unit 20 and the memory control unit 22, or directly via the memory control unit 22.

Image data for display that has been written to the image display memory 24 is displayed on the display unit 23, which is composed of a TFT LCD, or the like, via the D/A converter 21. An electronic viewfinder function for displaying live images can be realized by sequentially displaying image data pieces obtained through image capture with use of the display unit 23.

The memory 25 has a storage capacity that is sufficient to store a predetermined number of still images and moving images of a predetermined length of time, and stores still images and moving images that have been shot. Furthermore, the memory 25 can also be used as a working area for the system control unit 50.

The exposure control unit 40 controls the shutter 12, which has a diaphragm function. Furthermore, the exposure control unit 40 also exerts a flash light adjustment function by operating in coordination with a flash 44. The focus control unit 41 performs focus adjustment by driving a non-illustrated focus lens included in the photographing lens 11 based on an instruction from the system control unit 50. A zoom control unit 42 controls zooming by driving a non-illustrated zoom lens included in the photographing lens 11. The flash 44 has a function of emitting AF auxiliary light, and a flash light adjustment function.

The system control unit 50 controls the entirety of the digital camera 100. A nonvolatile memory 51 is an electrically erasable and recordable nonvolatile memory, for example, an EEPROM, or the like, is used thereas. Note that not only programs, but also map information, and the like, are recorded in the nonvolatile memory 51.

A shutter switch 61 (SW1) is turned ON and issues an instruction for starting operations of AF processing, AE processing, AWB processing, EF processing, and the like, in the midst of an operation on a shutter button 60. A shutter switch 62 (SW2) is turned ON and issues an instruction for starting a series of shooting operations, including exposure processing, development processing, and recording processing, upon completion of the operation on the shutter button 60. In the exposure processing, signals that have been read out from the image sensor 13 are written to the memory 25 as RAW image data via the A/D converter 15 and the memory control unit 22. In the development processing, the image processing unit 20 and the memory control unit 22 perform computation to develop RAW image data that has been written to the memory 25 and write the same to the memory 25 as image data. In the recording processing, image data is read out from the memory 25, the image data is compressed by the image processing unit 20, the compressed image data is stored to the memory 25, and then the stored image data is written to an external recording medium 91 via a card controller 90.

An operation unit 63 includes such operation members as various types of buttons and a touchscreen. For example, the operation unit 63 includes a power button, a menu button, a mode changing switch for switching among a shooting mode, a reproduction mode, and other special shooting modes, directional keys, a set button, a macro button, and a multi-screen reproduction page break button. Also, for example, the operation unit 63 includes a flash setting button, a button for switching among single shooting, continuous shooting, and self-timer, a menu change + (plus) button, a menu change − (minus) button, a shooting image quality selection button, an exposure correction button, a date/time setting button, and so forth.

When image data is to be recorded in the external recording medium 91, a metadata generation and analysis unit 70 generates various types of metadata, such as information of the Exif (Exchangeable image file format) standard to be attached to the image data, based on information at the time of shooting. Also, when image data recorded in the external recording medium 91 has been read in, the metadata generation and analysis unit 70 analyzes metadata added to the image data. Examples of metadata include shooting setting information at the time of shooting, image data information related to image data, feature information of a subject included in image data, and so forth. Furthermore, when moving image data is to be recorded, the metadata generation and analysis unit 70 can also generate and add metadata with respect to each frame.

A power 80 includes, for example, a primary battery such as an alkaline battery and a lithium battery, a secondary battery such as a NiCd battery, a NiMH battery, and a Li battery, or an AC adapter. A power control unit 81 supplies power supplied from the power 80 to each component of the digital camera 100.

The card controller 90 transmits/receives data to/from the external recording medium 91, such as a memory card. The external recording medium 91 is composed of, for example, a memory card, and images (still images and moving images) shot by the digital camera 100 are recorded therein.

Using an inference model recorded in an inference model recording unit 72, an inference engine 73 performs inference with respect to image data that has been input via the system control unit 50. The system control unit 50 can record an inference model that has been input from an external apparatus (not shown) via a communication unit 71 in the inference model recording unit 72. Also, the system control unit 50 can record, in the inference model recording unit 72, an inference model that has been obtained by re-training the inference model with use of a training unit 74. Note, there is a possibility that an inference model recorded in the inference model recording unit 72 is updated due to inputting of an inference model from an external apparatus, or re-training of an inference model with use of the training unit 74. For this reason, the inference model recording unit 72 holds version information so that the version of an inference model can be identified.

Also, the inference engine 73 includes a neural network design 73*a*. The neural network design 73*a* is configured in such a manner that intermediate layers (neurons) are arranged between an input layer and an output layer. The system control unit 50 inputs image data to the input layer. Neurons in several layers are arranged as the intermediate layers. The number of layers of neurons is determined as appropriate in terms of design. Furthermore, the number of neurons in each layer is also determined as appropriate in terms of design. In the intermediate layers, weighting is performed based on an inference model recorded in the inference model recording unit 72. An inference result corresponding to the image data input to the input layer is output to the output layer.

It is assumed that, in the present embodiment, an inference model recorded in the inference model recording unit 72 is an inference model that infers classification, that is to say, what kind of subject is included in an image. An inference model is used that has been generated through deep learning while using image data pieces of various subjects, as well as the result of classification thereof (e.g., classification of animals such as dogs and cats, classification of subject types such as humans, animals, plants, and buildings, and so forth), as supervisory data. Therefore, when an image has been input, together with information indicating a region of a subject that has been detected in this image, to the inference engine 73 that uses the inference model, an inference result indicating classification of this subject is output.

Upon receiving a request from the system control unit 50, or the like, the training unit 74 re-trains an inference model. The training unit 74 includes a supervisory data recording unit 74*a*. Information related to supervisory data for the inference engine 73 is recorded in the supervisory data recording unit 74*a*. The training unit 74 can cause the inference engine 73 to be re-trained with use of the supervisory data recorded in the supervisory data recording unit 74*a*, and update the inference engine 73 with use of the inference model recording unit 72.

The communication unit 71 includes a communication circuit for performing transmission and reception. Communication performed by the communication circuit specifically may be wireless communication via Wi-Fi, Bluetooth®, or the like, or may be wired communication via Ethernet, a USB, or the like.

Composition Processing by Image Processing Unit 20

A description is now given of composition processing in which a plurality of image data pieces (a plurality of material images) are composited by the image processing unit 20. As the composition processing, the image processing unit 20 can execute four types of processing: addition composition processing, weighted addition composition processing, lighten composition processing, and darken composition processing. It is assumed that the pixel value of a pre-composition image i (i=1 to N) is I_i (x, y) (where x, y denotes coordinates in the image), and the pixel value of a composite image is I (x, y). As a pixel value, values of respective signals of R, G1, G2, and B based on the Bayer array may be used, or a value of a luminance signal obtained from a group of signals of R, G1, G2, and B (a luminance value) may be used. At this time, a luminance value may be calculated on a per-pixel basis after executing interpolation processing with respect to signals based on the Bayer array in such a manner that signals of R, G, and B exist on a per-pixel basis. For example, provided that a luminance value is Y, a computation formula for performing calculation by way of weighted addition of signals of R, G, and B, such as $Y=0.3\times R+0.59\times G+0.11\times B$, is used as a computation formula for the luminance value. The composition processing is executed based on each pixel value for which the positions have been aligned by executing such processing as positioning among a plurality of images as necessary.

The addition composition processing is executed in accordance with the following formula. That is to say, the image processing unit 20 generates a composite image by executing addition processing with respect to pixel values of N images, pixel by pixel.

$$I(x,y)=I\_1(x,y)+I\_2(x,y)+\ldots+I\_N(x,y)$$

The weighted addition composition processing is executed in accordance with the following formula.

ai (i=1 to N) is a weighting coefficient.

That is to say, the image processing unit 20 generates a composite image by executing weighted addition processing with respect to pixel values of N images, pixel by pixel. In a case when a1+a2+ . . . +aN=1, the following formula is equivalent to weighted average processing.

$$I(x,y)=a1\times I\_1(x,y)+a2\times 1\_2(x,y)+\ldots+aN\times I\_N(x,y)$$

The lighten composition processing is executed in accordance with the following formula. That is to say, the image processing unit 20 generates a composite image by selecting the maximum value of pixel values of N images, pixel by pixel.

$$I(x,y)=\max(I\_1(x,y),I\_2(x,y),\ldots,I\_N(x,y))$$

The darken composition processing is executed in accordance with the following formula. That is to say, the image processing unit 20 generates a composite image by selecting the minimum value of pixel values of N images, pixel by pixel.

$$I(x,y)=\min(I\_1(x,y),I\_2(x,y),\ldots,I\_N(x,y))\cdot$$

Multiple Composition Shooting Processing

Figure 2:
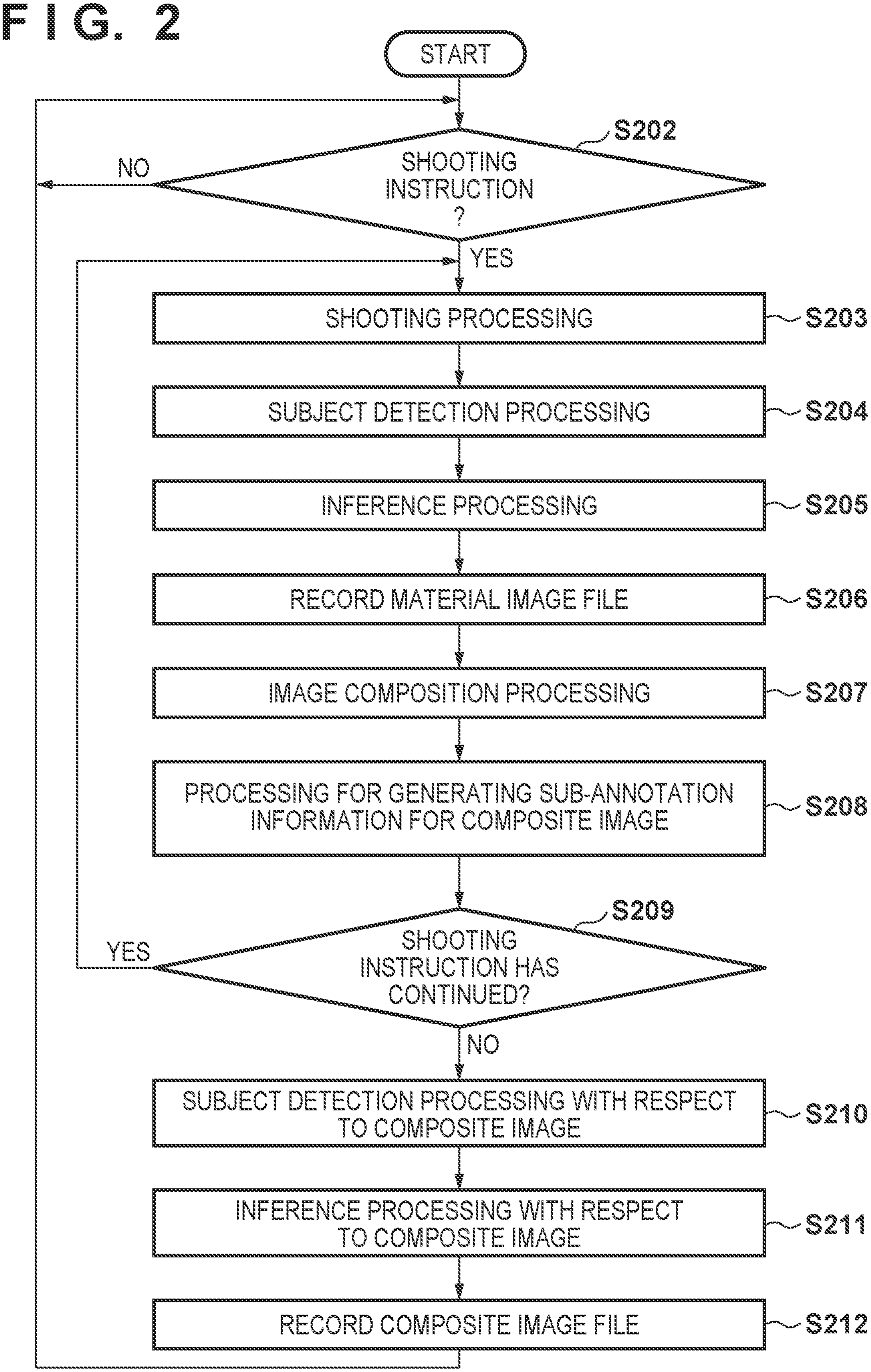
FIG. 2 is a flowchart of multiple composition shooting processing executed by the digital camera 100.

Next, multiple composition shooting processing executed by the digital camera 100 will be described with reference to FIG. 2 to FIG. 7B. FIG. 2 is a flowchart of the multiple composition shooting processing executed by the digital camera 100. Processing of each step in the present flowchart is realized by the system control unit 50 of the digital camera 100 controlling respective constituent elements of the digital camera 100 in accordance with a program, unless specifically stated otherwise. When the operation mode of the digital camera 100 has been set to a multiple shooting mode, the multiple composition shooting processing of the present flowchart is started. Note that a user can set the operation mode of the digital camera 100 to the multiple shooting mode by causing a menu screen to be displayed on the display unit 23 via an operation on the operation unit 63 and selecting the multiple shooting mode on the menu screen.

In step S202, the system control unit 50 determines whether the user has issued a shooting instruction. The user can issue the shooting instruction by depressing the shutter button 60, thereby turning ON the shutter switches 61 (SW1) and 62 (SW2). The system control unit 50 repeats determination processing in step S202 until the user issues the shooting instruction. Once the user has issued the shooting instruction, processing steps proceed to step S203.

Processing of steps S203 to S208 is repeatedly executed until it is determined that the shooting instruction has not continued in step S209, which will be described later. In the following description, it is assumed that processing of steps S203 to S208 has been executed eleven times (therefore, eleven material images have been generated).

Figure 4:
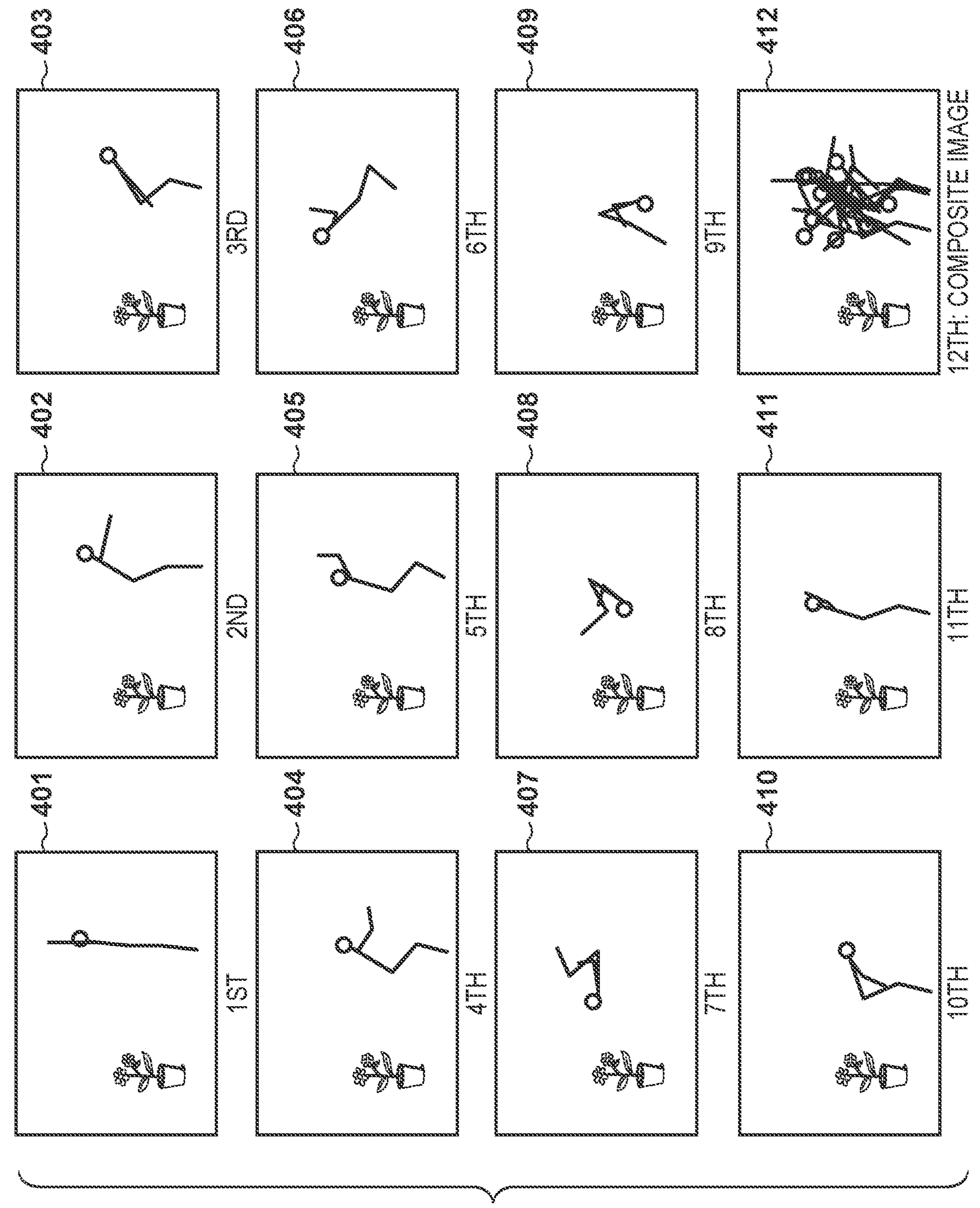
FIG. 4 is a diagram showing material images 401 to 411 and a composite image 412 as examples of material images and a composite image obtained as a result of processing of steps S203 to S208.

FIG. 4 is a diagram showing material images 401 to 411 and a composite image 412 as examples of material images and a composite image obtained as a result of processing of steps S203 to S208.

In step S203, the system control unit 50 executes shooting processing. In the shooting processing, the system control unit 50 executes AF (autofocus) processing and AE (automatic exposure) processing with use of the focus control unit 41 and the exposure control unit 40, and then stores image signals that are output from the image sensor 13 via the A/D converter 15 into the memory 25. Also, the image processing unit 20 generates image data of a format conforming to a user setting (e.g., a JPEG format) by executing compression processing conforming to the user setting with respect to the image signals stored in the memory 25.

In step S204, the image processing unit 20 executes subject detection processing with respect to the image signals stored in the memory 25, and obtains information of subjects included in the image (subject detection information).

In step S205, with use of the inference engine 73, the system control unit 50 executes inference processing with respect to the subjects that were detected from the image signals (material image) stored in the memory 25. The system control unit 50 specifies subject regions within the image based on the image signals stored in the memory 25 and on the subject detection information obtained in step S204. The system control unit 50 inputs the image signals (material image), as well as information indicating the subject regions in the material image, to the inference engine 73. An inference result indicating classification of the subjects included in the subject regions is output as the result of execution of the inference processing by the inference engine 73 for each subject region. Note that the inference engine 73 may output information related to the inference processing, such as debug information and logs associated with the operations of the inference processing, in addition to the inference result.

In step S206, the system control unit 50 records a file including the image data generated in step S203, the subject detection information obtained in step S204, and the inference result obtained in step S205 as a material image file for multiple composition into the external recording medium 91.

Figure 3A:
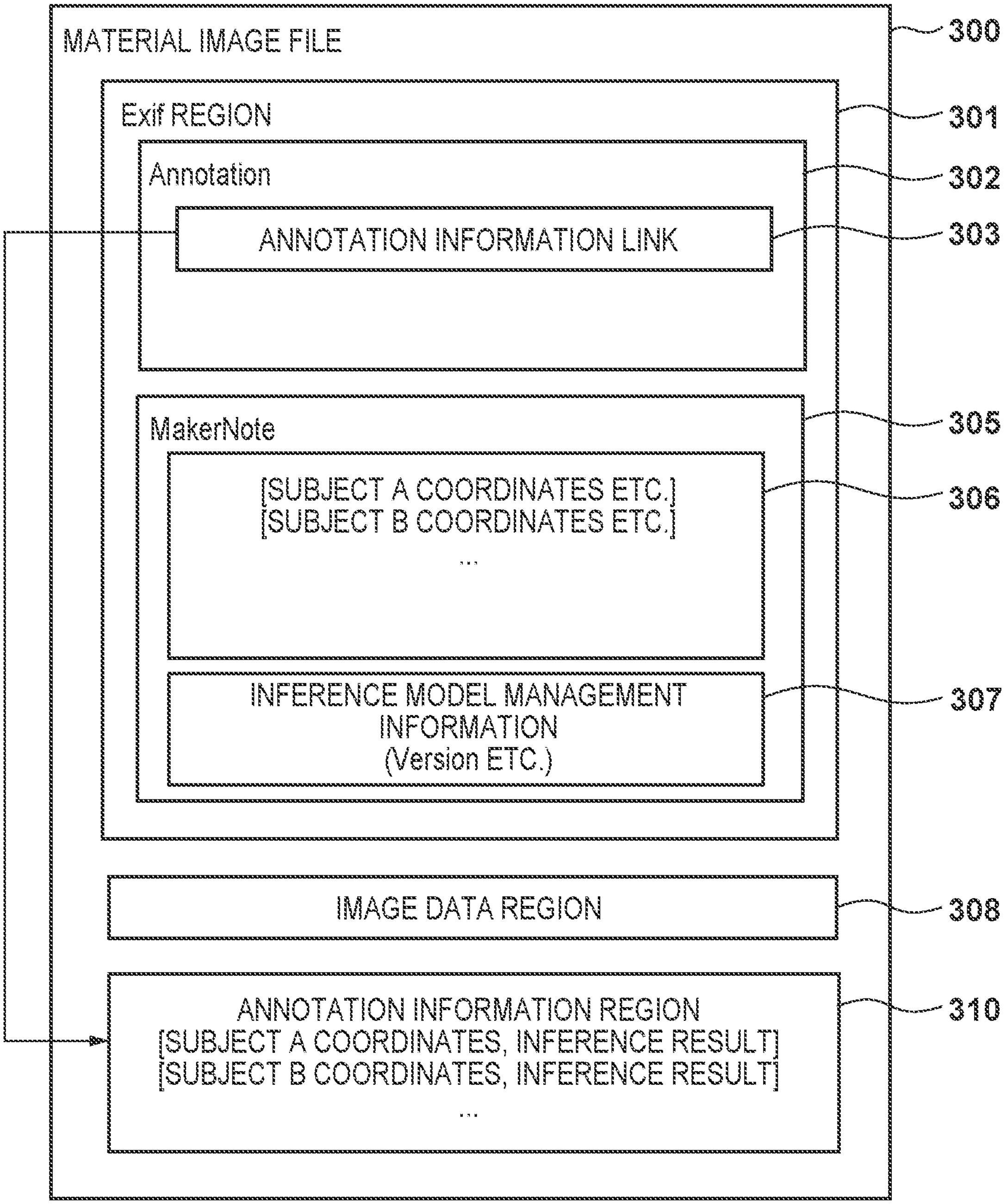
FIG. 3A is a diagram showing an exemplary configuration of a material image file.

FIG. 3A is a diagram showing an exemplary configuration of a material image file. As shown in FIG. 3A, a material image file 300 is divided into a plurality of storage regions, and includes an Exif region 301 for storing metadata conforming to the Exif standard, as well as an image data region 308 in which compressed image data is recorded. Furthermore, the material image file 300 also includes an annotation information region 310 in which annotation information is recorded. In a case when the material image file 300 is a file of a JPEG format, each of the plurality of storage regions is defined by a marker. For example, in a case when the user has issued an instruction for recording images in the JPEG format, the material image file 300 is recorded in the JPEG format. In this case, the image data generated in step S203 is recorded in the image data region 308 in the JPEG format, and information of the Exif region 301 is recorded in a region defined by, for example, an APP1 marker, or the like. Also, information of the annotation information region 310 is recorded in a region defined by, for example, an APP11 marker, or the like. In a case when the user has issued an instruction for recording images in an HEIF (High Efficiency Image File Format) format, the material image file 300 is recorded in an HEIF file format. In this case, information of the Exif region 301 and the annotation information region 310 is recorded in, for example, a Metadata Box. Also, in a case when the user has issued an instruction for recording images in a RAW format, information of the Exif region 301 and the annotation information region 310 is similarly recorded in a predetermined region, such as a Metadata Box.

The metadata generation and analysis unit 70 records the subject detection information obtained in step S204 into a subject detection information tag 306 within a MakerNote 305 (a region in which metadata unique to a maker can be described in a basically-undisclosed form) included in the Exif region 301. Also, in a case when there are version information of the current inference model recorded in the inference model recording unit 72, debug information output from the inference engine 73 in step S205, and so forth, these pieces of information are recorded inside the MakerNote 305 as inference model management information 307.

The inference result obtained in step S205 is recorded in the annotation information region 310 as annotation information. The location of the annotation information region 310 is indicated by an annotation information link 303 included in an annotation link information storage tag 302. In the present embodiment, it is assumed that annotation information is described in a text format, such as XML and JSON.

FIG. 5A and FIG. 5B are diagrams showing examples of annotation information including the inference result for a material image. The system control unit 50 manages the same subject included in a plurality of material images that are continuously shot with use of the same subject number (subject identification information for identifying the subject). For example, as a subject 502 in material images 401 and 411 are stationary, the same inference result indicating that the subject 502 is "subject 1" is recorded with respect to both of the material images 401 and 411. Also, a subject 503 in the material image 401 and a subject 504 in the material image 411 are the same subject although their postures are different. Therefore, the subject 503 and the subject 504 are both recorded as "subject 2". In the inference results for "subject 2", information of the positions of the subject (coordinates of the position of the head, the positions of the eyes, etc.) varies among material images, but the same information is recorded for each material image with regard to other information (the sex, age, name, etc.).

Returning to FIG. 2, in step S207, the image processing unit 20 executes composition processing for material images. In processing of the first step S207 (i.e., at the time of processing related to the material image 401), the image processing unit 20 stores the image data generated in step S202 as a composite image to a composite image region of the memory 25. In processing of the second or subsequent step S207 (i.e., at the time of processing related to any of material images 402 to 411), the image processing unit 20 composites the composite image stored in the composite image region of the memory 25 and the image data generated in step S202, and stores the composition result as a new composite image to the composite image region of the memory 25.

In step S208, the system control unit 50 executes processing for generating sub-annotation information for the composite image based on the inference result obtained in step S205 (i.e., the inference result for the material image). Specifically, in processing of the first step S208 (i.e., at the time of processing related to the material image 401), the system control unit 50 generates sub-annotation information including the inference result obtained in step S205 within the memory 25. In processing of the second or subsequent step S207 (i.e., at the time of processing related to any of the material images 402 to 411), the system control unit 50 adds information related to the inference result obtained in step S205 to the sub-annotation information stored in the memory 25. In this way, the inference result for the material image can be carried on into the composite image.

FIG. 6B and FIG. 7A are diagrams showing exemplary configurations of sub-annotation information. As shown in FIG. 6B, the system control unit 50 may simply add the inference results that were obtained in step S205 for respective material images to sub-annotation information. In this case, the sub-annotation information that is ultimately obtained includes all inference results corresponding to all material images. Alternatively, as shown in FIG. 7A, the system control unit 50 may add information of differences between the inference result obtained in step S205 and the existing inference result included in the sub-annotation information to the sub-annotation information.

In step S209, the system control unit 50 determines whether the shooting instruction by the user has continued. The user can continue the shooting instruction by continuously placing the shutter switches 61 (SW1) and 62 (SW2) in the ON state while continuously depressing the shutter button 60. Processing steps return to step S203 in a case when the shooting instruction has continued, and processing steps proceed to step S210 in a case when the shooting instruction has not continued.

In step S210, the image processing unit 20 executes subject detection processing with respect to the composite image generated through processing of step S207, and obtains information of subjects included in the composite image (subject detection information). Processing of step S210 is similar to processing of step S204, except that the target of processing is the composite image rather than the material image.

In step S211, using the inference engine 73, the system control unit 50 executes inference processing with respect to the composite image. Processing of step S211 is similar to processing of step S205, except that the target of processing is the composite image rather than the material image. FIG. 5C is a diagram showing an example of annotation information including the inference result for a composite image. Note that the system control unit 50 manages the same subject included in one or more material images and a composite image with use of the same subject number (subject identification information for identifying the subject). For example, as can be understood from FIGS. 5A to 5C, as the subject 502 included in the composite image 412 is the same subject as the subject 502 included in the material images 401 and 411, these subjects are all recorded as "subject 1". Also, at the positions of the subjects 503 and 504 included in the material images 401 and 411, the subject moves from one material image to another, and thus the plurality of subjects overlap one another in the composite image. From the overlapping subjects, no subject is detected and it is not possible to infer that the subjects are a person. Thus, in the inference result for the composite image, a subject corresponding to a person is not recorded.

In step S212, the system control unit 50 records a file including the composite image generated in step S207, the sub-annotation information generated in step S207, the subject detection information obtained in step S210, and the inference result obtained in step S211, in the external recording medium 91 as a composite image file.

Figure 3B:
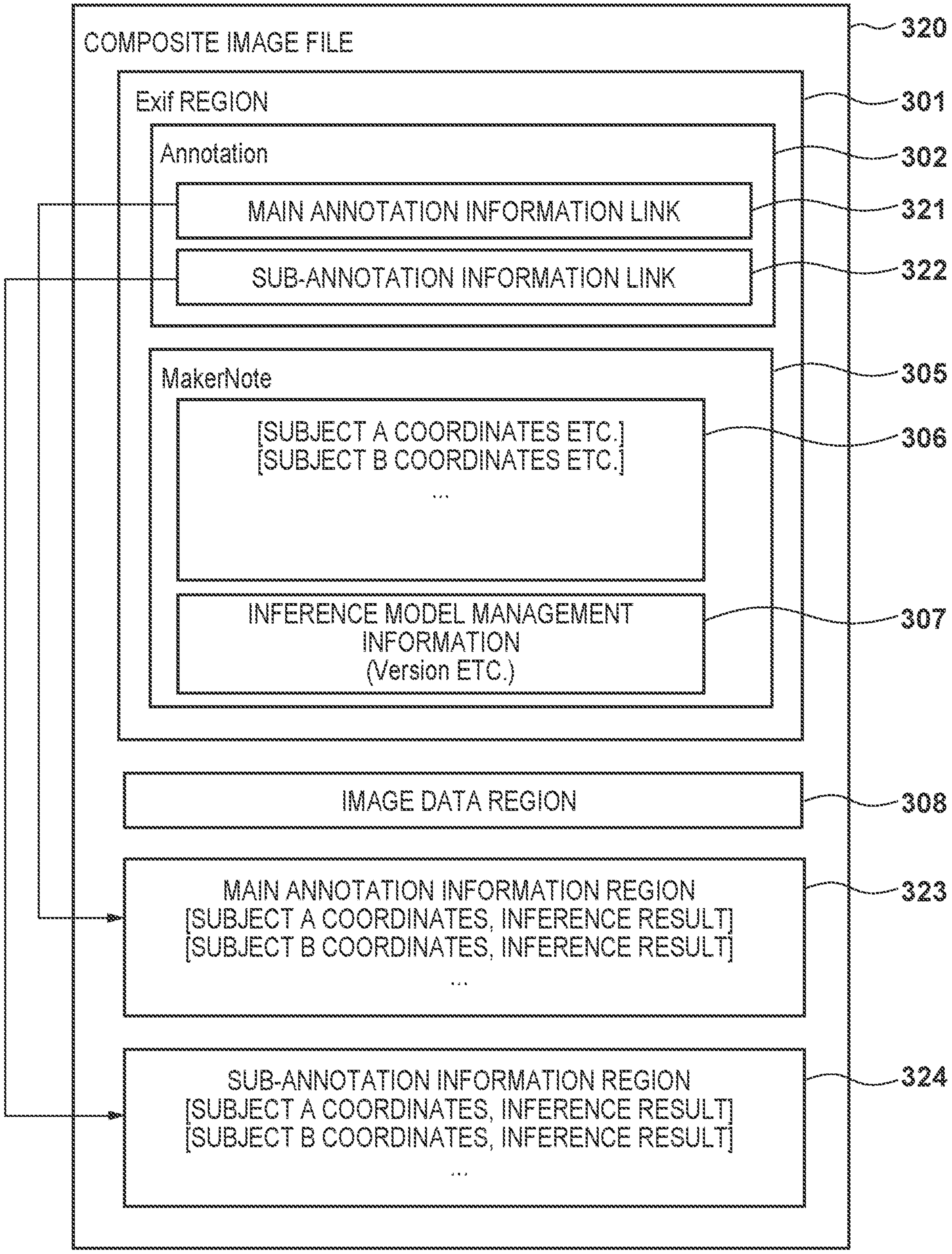
FIGS. 3B and 3C are diagrams showing exemplary configurations of a composite image file.
Figure 3C:
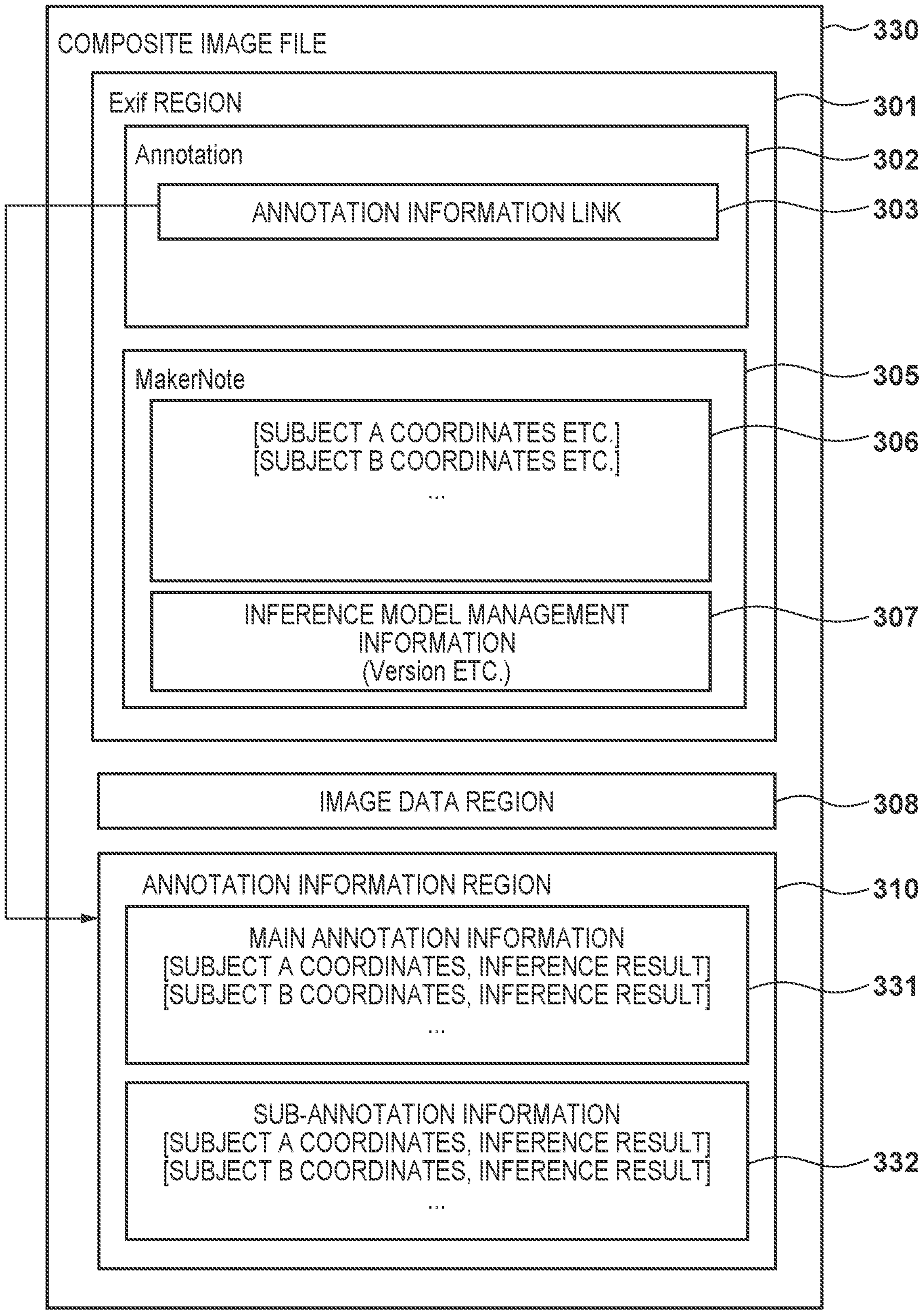

FIG. 3B and FIG. 3C are diagrams showing exemplary configurations of a composite image file. As shown in FIG. 3B and FIG. 3C, the composite image generated in step S207 is stored to an image data region 308 in a composite image file 320 or 330. Also, the subject detection information obtained in step S210 is recorded in a subject detection information tag 306 inside a MakerNote 305 in the composite image file 320 or 330.

In the case of the composite image file 320 shown in FIG. 3B, the inference result obtained from the composite image in step S211 is recorded in a main annotation information region 323. Also, the sub-annotation information generated in step S208 is recorded in a sub-annotation information region 324. In the case of FIG. 3B, the main annotation information region 323 and the sub-annotation information region 324 are storage regions that are defined by, for example, different APP11 markers or different Metadata Boxes. The location of the main annotation information region 323 is indicated by a main annotation information link 321 included in an annotation link information storage tag 302. The sub-annotation information region 324 is indicated by a sub-annotation information link 322 included in the annotation link information storage tag 302.

In the case of the composite image file 330 shown in FIG. 3C, main annotation information and sub-annotation information are recorded in the same storage region, such as a region defined by an APP11 marker and a Metadata Box (an annotation information region 310). In the annotation information region 310, the main annotation information and the sub-annotation information are stored separately in different tags (a main annotation information tag 331 and a sub-annotation information tag 332). The location of the annotation information region 310 is indicated by an annotation information link 303 included in an annotation link information storage tag 302.

FIG. 6A is a diagram showing an exemplary configuration of main annotation information including an inference result, which is recorded in the main annotation information region 323 or the main annotation information tag 331. As shown in FIG. 6A, in main annotation information, information for identifying an image (image identification information), such as the file number of a composite image file, may be recorded in association with the inference result for subjects that have been detected in a composite image. Similarly, as shown in FIG. 6B and FIG. 7A, in sub-annotation information, information for identifying a material image (image identification information), such as the number of a material image file, may be recorded in association with the inference result for subjects that have been detected in a material image. Alternatively, as shown in FIG. 7B, sub-annotation information may not include information for identifying a material image (image identification information), such as the number of a material image file. For example, in a case when a material image file is not stored (a case when a material image is discarded after a composite image is generated), and the like, information for identifying the material image is unnecessary. In a case like this, it is possible to adopt the configuration of FIG. 7B.

As described above, according to the first embodiment, the digital camera 100 obtains a plurality of material images (e.g., the material image 401 and the material image 402), and subject information pieces indicating subjects that have been detected from respective material images (e.g., information including the inference results from the inference engine 73). Also, the digital camera 100 generates a composite image by compositing the plurality of material images. Furthermore, the digital camera 100 records the subject information pieces of the respective material images in association with the composite image by, for example, generating and recording a composite image file including the subject information pieces of the respective material images and the composite image.

In this way, according to the first embodiment, subject information pieces of respective material images are recorded in association with the composite image. Therefore, even in a case when a subject detected from a material image cannot be detected from a composite image generated from a plurality of material images, subject information indicating this subject can be obtained together with the composite image.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

at least one processor and/or at least one circuit that functions as:

an obtainment unit configured to obtain a first image, first subject information indicating a first subject detected from the first image, a second image, and second subject information indicating a second subject detected from the second image;

a composition unit configured to generate a composite image by compositing the first image and the second image; and a recording unit configured to record the composite image as an image file, wherein the recording unit records both of the first subject information and the second subject information in the image file in which the composite image is stored, when there is a case in which the first subject information and the second subject information cannot be generated from the composite image when the first subject and the second subject are a same subject with different postures and are composited overlappingly in the composite image.

2. The image processing apparatus according to claim 1, wherein, in a case when the first subject and the second subject are the same subject, the recording unit records the second subject information as difference information with respect to the first subject information.

3. The image processing apparatus according to claim 1, wherein the recording unit records, in the image file, first image identification information for identifying the first image in association with the first subject information, and records, in the image file, second image identification information for identifying the second image in association with the second subject information.

4. The image processing apparatus according to claim 1, wherein the at least one processor and/or the at least one circuit further functions as:

a generation unit configured to detect a subject from the composite image and to generate subject information indicating the subject, wherein, in a case when the first subject and the second subject are a same third subject that is stationary, the generation unit generates third subject information indicating the third subject that has been detected from the composite image and the recording unit records the third subject information in the image file in which the composite image is stored, and, in a case when the first subject and the second subject are a same fourth subject with different postures and undetectable from the composite image because they are composited overlappingly in the composite image, generating, by the generation unit, fourth subject information indicating the fourth subject from the composite image and recording, by the recording unit, of the fourth subject information in the image file are not performed.

5. The image processing apparatus according to claim 4, wherein the image file is divided into a plurality of storage regions, the first subject information and the second subject information are stored in a first storage region included among the plurality of storage regions, and the third subject information is stored in a second storage region that is included among the plurality of storage regions and that is different from the first storage region.

6. The image processing apparatus according to claim 5, wherein the image file is a file of a JPEG format, and each of the plurality of storage regions is defined by a marker.

7. The image processing apparatus according to claim 4, wherein the image file is divided into a plurality of storage regions, and the first subject information, the second subject information, and the third subject information are stored in the same storage region included among the plurality of storage regions.

8. The image processing apparatus according to claim 4, wherein the first subject information includes first subject identification information for identifying the first subject, the second subject information includes second subject identification information for identifying the second subject, and, in a case when the first subject and the second subject are the same subject, the first subject identification information is identical to the second subject identification information.

9. The image processing apparatus according to claim 4, wherein the generation unit generates the third subject information by executing inference processing with use of an inference model with respect to the third subject that has been detected from the composite image.

10. The image processing apparatus according to claim 9, wherein the inference model is configured to infer classification of a subject.

11. An image capturing apparatus comprising:

the image processing apparatus according to claim 1, wherein the at least one processor and/or the at least one circuit further function as:

an image capturing unit configured to generate the first image and the second image;

a generation unit configured to detect the first subject from the first image, and to detect the second subject from the second image, and to generate the first subject information indicating the first subject that has been detected from the first image, and the second subject information indicating the second subject that has been detected from the second image, wherein the obtainment unit obtains the first image and the second image generated by the image capturing unit, as well as the first subject information and the second subject information generated by the generation unit.

12. An image capturing apparatus comprising:

the image processing apparatus according to claim 4, wherein the at least one processor and/or the at least one circuit further function as an image capturing unit configured to generate the first image and the second image, wherein the generation unit detects the first subject from the first image, and detects the second subject from the second image, generates the first subject information indicating the first subject that has been detected from the first image, and the second subject information indicating the second subject that has been detected from the second image, and the obtainment unit obtains the first image and the second image generated by the image capturing unit, as well as the first subject information and the second subject information generated by the generation unit.

13. An image processing method executed by an image processing apparatus, the method comprising:

obtaining a first image, first subject information indicating a first subject detected from the first image, a second image, and second subject information indicating a second subject detected from the second image;

generating a composite image by compositing the first image and the second image; and recording the composite image as an image file, wherein the recording records both of the first subject information and the second subject information in the image file in which the composite image is stored, when there is a case in which the first subject information and the second subject information cannot be generated from the composite image when the first subject and the second subject are a same subject with different postures and are composited overlappingly in the composite image.

14. A non-transitory computer-readable storage medium that stores a program for causing a computer to execute an image processing method comprising:

obtaining a first image, first subject information indicating a first subject detected from the first image, a second image, and second subject information indicating a second subject detected from the second image;

generating a composite image by compositing the first image and the second image; and recording the composite image as an image file, wherein the recording records both of the first subject information and the second subject information in the image file in which the composite image is stored, when there is a case in which the first subject information and the second subject information cannot be generated from the composite image when the first subject and the second subject are a same subject with different postures and are composited overlappingly in the composite image.

* * * * *